Jan. 2, 1962  J. A. VILLE ET AL  3,015,446
SERVO-RESOLVERS
Filed July 15, 1957
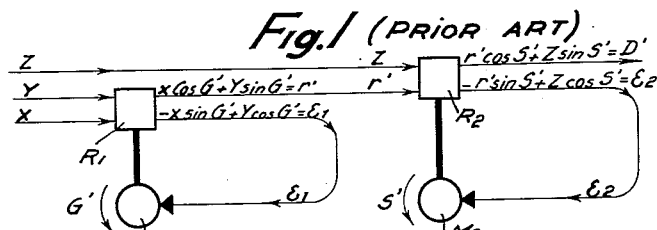
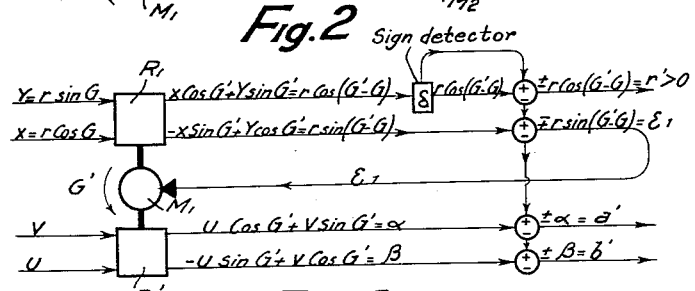
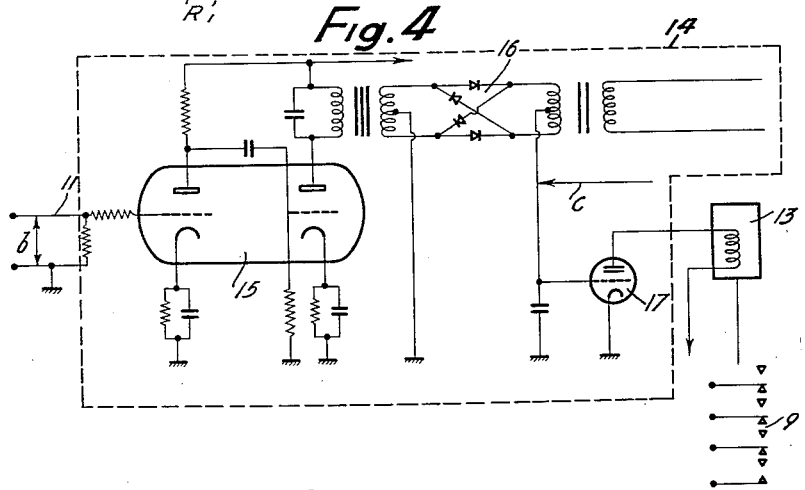
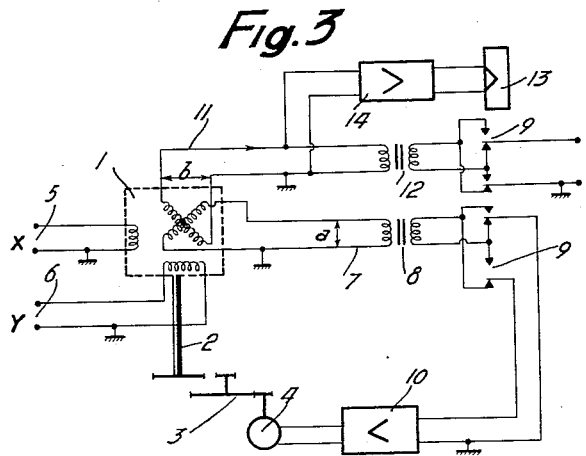

United States Patent Office 3,015,446
Patented Jan. 2, 1962

---

3,015,446
SERVO-RESOLVERS
Jean André Ville and Jean Théophile Marie Gustave Bouzitat, Paris, France, assignors to Societe Alsacienne de Constructions Mecaniques, Mulhouse (Haut-Rhin), France, a public establishment of France
Filed July 15, 1957, Ser. No. 671,908
Claims priority, application France July 23, 1956
4 Claims. (Cl. 235—189)

The invention relates to improvements in servo-resolvers which effect conversion of co-ordinates.

In analog computers, the servo-resolvers have for an object, among others, to resolve the rectangular or cartesian co-ordinates of a mobile point P into the spherical co-ordinates thereof.

Whereas in rectangular axis the co-ordinates of a point P are generally designated by the letters $x$, $y$, $z$, the position of P is defined in spherical co-ordinates by its distance D (to the zero point), its angle of bearing G and its angle of elevation S. In such spherical co-ordinates, the axis Oz, generally called the vertical axis, around which are performed the bearing rotations, forms a single straight line: for any point on said vertical axis Oz, the bearing G is indeterminate and the angle of elevation is equal to $\pm \pi/2$ radians (all angles being expressed in radians). When a mobile point P crosses the vertical axis Oz, its bearing varies abruptly by $\pi$ and the absolute value of its angle of elevation passes through a maximum value of $\pi/2$ radians.

Due to these mathematical conditions, the servo-resolver comprising the shaft rotating in the angle of bearing G undergoes a considerable phase displacement or shift relatively to the point P when said point passes in the close vicinity of the vertical axis, because the rotation speed of the shaft in G is in practice limited to $\pi/4$ radians per second. This phase displacement leads to errors in the computer and such errors are able to have a detrimental effect on the succession of the performed calculations.

In order to clearly explain the position of the drawbacks resulting from the above-mentioned conditions, a preliminary description of the working process of servo-resolvers of the prior art will be given with reference to FIG. 1 showing diagrammatically a computer including a pair of servo-resolvers $R_1$ and $R_2$ and enabling a continuous calculation to be made of the spherical co-ordinates D, G, S of a point P starting from the right-angled co-ordinates $x$, $y$, $z$; the computer has therefore to resolve the following equation system:

(1) $\begin{cases} D \cos S . \cos G = x \\ D \cos S . \sin G = y \\ D \sin S = z \end{cases}$ The resolver $R_1$ which comprises a shaft driven in rotation through an angle G by a servo-motor $M_1$, receives two voltages varying directly as $x$ and $y$ respectively and delivers a third and a fourth voltage respectively proportional to $r'$ and $\epsilon_1$ given by the formulae:

(2)
$r' = x \cos G' + y \sin G'$
$\quad = D \cos S . \cos (G' - G) = r \cos (G' - G)$
$\epsilon_1 = -x \sin G' + y \cos G'$
$\quad = -D \cos S . \sin (G' - G) = -r \sin (G' - G)$ where $r = D \cos S$ is the horizontal distance of point P (to the zero point).

The voltage $\epsilon_1$, suitably amplified, controls the rotation of servo-motor $M_1$ and drives it in the direction which increases or reduces the angle $G'$ according as $\epsilon_1$ has a positive or negative value respectively.

Therefore the angle $G'$ tends to become equal to the angle of bearing G (to within $2k\pi$) and consequently the shaft of the servo-resolver $R_1$ has a single position of stable equilibrium, i.e. the position wherein $G'=G$ and $r'=r>0$. Furthermore, the voltage $\epsilon_1$ has always a small absolute value.

Similarly, the servo-resolver $R_2$, which comprises a shaft driven in rotation through an angle $S'$ by a servo-motor $M_2$, receives two voltages varying directly as $r'$ and $z$ respectively and delivers two voltages respectively proportional to $D'$ and $\epsilon_2$ given by the formulae (3')
$\begin{cases} D' = r' \cos S' + z \sin S' \\ \quad = D[\cos S' . \cos S . \cos (G'-G) + \sin S' . \sin S] \\ \epsilon_2 = -r' \sin S' + z \cos S' \\ \quad = D[-\sin S' . \cos S . \cos (G'-G) + \cos S' . \sin S] \end{cases}$ or (3)
$\begin{cases} D' = D\left[ \cos (S - S') - 2 \cos S' . \cos S . \sin^2 \frac{G'-G}{2} \right] \\ \epsilon_2 = D\left[ -\sin (S - S') + 2 \sin S' . \cos S . \sin^2 \frac{G'-G}{2} \right] \end{cases}$ The voltage $\epsilon_2$, after suitable amplification, controls the rotation of servo-motor $M_2$ and tends to drive it in the direction which increases or reduces angle $S'$ according as $\epsilon_2$ has a positive or negative value respectively.

Therefore, if $G'=G$ (or even if the difference $G'-G$ is small), angle $S'$ tends to become equal to S and, consequently, the shaft of servo-resolver $R_2$ has a single position of stable equilibrium, i.e. the position wherein $S'=S$ and $D'=D>0$. Furthermore, the voltage $\epsilon_2$ has always a small absolute value.

If, as is normally admissible, $\epsilon_1$ and $\epsilon_2$ are considered as two infinitesimal quantities of the same order, it readily appears from the Equations 2 and 3 that if $\epsilon_1$ remains infinitely small relative to $D \cos S = r$:

(4) $\begin{cases} G - G' \sim -\dfrac{\epsilon_1}{D \cos S} = -\dfrac{\epsilon_1}{r} \\ S' - S \sim -\dfrac{\epsilon_2}{D} \end{cases}$ (5) $\begin{cases} r' \sim D \cos S \left( \dfrac{\epsilon_1^2}{1 - 2D^2 \cos^2 S} \right) = r\left( 1 - \dfrac{\epsilon_1^2}{2r^2} \right) \\ D' \sim D\left( 1 - \dfrac{\epsilon_1^2 + \epsilon_2^2}{2D^2} \right) \end{cases}$ It is therefore possible to assimilate the angle $G'$ to the bearing G and eventually the distance $r'$ to the horizontal distance $r = D \cos S$.

The groups of Formulae 2 and 3 clearly show the above-mentioned disturbances or perturbations produced in the working process of the computer by the passage of the angle of elevation close to the $\pm \pi/2$ value or, in other words, the passing of the horizontal distance $r$ close to the 0 value.

Firstly the servo-control of resolver $R_1$ becomes slack or loose and the static error of $G^1 - G$ may reach rather high values; but it is possible to reduce said static error by a variable gain device which maintains substantially constant the tightness of the control.

Secondly the variation of the bearing G becomes too rapid to be followed by the rotation (in $G'$) of the shaft of motor $M_1$; this fact produces a material dynamic error on $G' - G$ and therefore, as shown by Formulae 3, on $S' - S$ and $D' - D$.

If it is assumed that the angle of elevation S passes exactly through the $\pi/2$ value, i.e. that the point P crosses the vertical Oz, the bearing varies abruptly by $\pi$ radians, and, as the rotation of the $G'$ shaft is unable to follow without a certain delay such a variation, the voltage $r'$ remains negative as long as $G'-G$ is greater than $\pi/2$.

With a servo-resolver $R_1$ of conventional type, the electric motor $M_1$, controlled by the voltage $$\epsilon_1 = -r \sin (G'-G)$$

drives $G'$ shaft through a rotation of $\pi$ radians so that said shaft regains its single position of stable equilibrium, wherein $G'=G$ and $r'=r>0$; such a rotation requires about 4 seconds and results therefore in errors.

The invention has therefore for an object an improved servo-resolver free of the above-mentioned drawbacks.

Another object of the invention is to provide an improved servo-resolver comprising for the rotating shaft thereof, two positions of stable equilibrium spaced apart by $\pi$ radians, said shaft being automatically directed to the nearest position of equilibrium.

The invention has also for an object a servo-resolver comprising in its output circuits a sign-detector ensuring an electrical displacement of $\pi$ radians of the zero point of the $G'$ rotations.

It is a further object of the invention to provide a computer for the transformation of rectangular co-ordinates in spherical co-ordinates comprising a shaft which never undergoes significant delay relative to the actual bearing to be determined.

A servo-resolver, according to the invention, is characterized by the fact that the shaft thereof is capable of occupying two positions of stable equilibrium corresponding to two angles differing by $\pi$ radians and chooses automatically, from said two positions, the position that it can reach through a rotation of an angle not greater than $\pi/2$ radians, the output elements being such that the equilibrium remains undisturbed by such choice.

According to a further feature of the invention such a possibility is realized by electrically displacing through $\pi$ radians the zero point of the $G'$ rotations by changing the signs of the voltages delivered by resolver $R_1$ without further modification thereof. In other words the half-turn that the $G'$ shaft could not perform mechanically without an appreciable and troublesome delay is effected electrically.

The changing of the voltage signs must, as a rule, take place at the very moment when the bearing $G$ varies abruptly by $\pi$ radians i.e. at the very moment when the voltage $$x \cos G' + y \sin G' = r \cos (G'-G)$$

delivered by resolver $R_1$ undergoes a change of sign as it passes through zero.

Therefore, according to the invention, said voltage passes through a sign-detector provided in the output circuits of resolver $R_1$, said sign-detector controlling a set of sign-inverters acting on both voltages delivered by resolver $R_1$ on the output side of said sign-detector.

Advantageously the output voltage:

$$x \cos G' + y \sin G' = r \cos (G'-G)$$

is amplified and then demodulated before being applied to a relay controlling the sign-detectors.

A servo-resolver for converting rectangular coordinates to spherical co-ordinates comprises therefore a shaft driven in rotation under the control of a voltage delivered by said servo-resolver, said shaft having, for each combination of input co-ordinates, two positions of stable equilibrium separated by an angle of $\pi$ radians, and means for directing said shaft automatically and continuously towards that of the said two positions, which said shaft can reach by a rotation through an angle not greater than $\pi/2$ radians.

More particularly such a servo-resolver comprises a first and a second servo-resolver for converting rectangular co-ordinates to spherical co-ordinates comprising a first and a second input circuit each receiving a rectangular co-ordinate, a shaft drivable in rotation, a first output circuit comprising in parallel a first amplifier delivering its output to a relay and a first sign-inverter, a second output circuit comprising in series a second sign-inverter and a second amplifier delivering its output to an electric motor driving said shaft, said relay actuating concomitantly said first and said second sign-inverter.

In particular in a preferred embodiment, said first amplifier may comprise in series, amplifying means, rectifying means and switching means controlling said relay, said amplifying means receiving the voltage delivered to said first output circuits and delivering an amplified current to said rectifying means, the output of said rectifying means being applied to said switching means.

The aforesaid and other objects, features and advantages of the invention will be more easily and fully understood from the illustration of embodiments of a servo-resolver according to the invention and parts thereof, it being understood that the invention is not restricted to the details of the illustrated and described embodiments, but that it is subject to modifications and adaptations.

In the attached drawings:

FIG. 2 is a block diagram of a servo-resolver, according to the invention, comprising two positions of stable equilibrium;

FIG. 3 shows the electrical circuit of an embodiment of a servo-resolver according to the invention;

FIG. 4 is a detailed view of a preferred amplifying, demodulating and switching assembly used in the embodiment of FIG. 3.

Reference will now be made to FIG. 2 illustrating a block diagram of a servo-resolver with two positions of stable equilibrium, which will hereinafter be termed a "bi-stable servo-resolver."

In FIG. 2 is illustrated, in addition to the servo-resolver $R_1$, a further resolver $R'_1$ arranged on the same shaft driven in rotation, according to $G'$, by an electric motor $M_1$. Resolver $R'_1$, receiving voltages $u$ and $v$, has the function, when the $G'$ shaft is correctly controlled, of delivering two voltages $a'$ and $b'$ which may be assimilated to voltages $a$ and $b$ given by the following formulae (6) $$\begin{cases} a = u \cos G + V \sin G \\ b = -u \sin G + V \cos G \end{cases}$$

The voltages $u$ and $v$ are two sinusoidal voltages of the same frequency and phase (the phase difference being 0 or $\pi$), the amplitudes of which represent two cartesian co-ordinates having peak amplitudes $u$ and $v$. The signs of the cartesian co-ordinates are positive and negative, depending on whether the corresponding voltage $u$ or $v$ is in phase or in phase opposition with a fixed reference phase in the calculator in which the resolver is incorporated.

The effect of the resolver is to produce in $u$ or $v$ the changes corresponding to a rotation $G$ in accordance with the Formulae 6, where $G$ is the angle through which the resolver has rotated from its position of origin.

It is clear that if the zero point of the $G'$ rotations is displaced by $\pi$, the signs of the voltages $\alpha$ and $\beta$ (7) $$\begin{cases} \alpha = u \cos G' + v \sin G' \\ \beta = -u \sin G' + v \cos G' \end{cases}$$

delivered by resolver $R'_1$ have to be changed for the formation of voltages $a'$ and $b'$ (the reversal of the signs of voltages $u$ and $v$ delivered to $R_1$ would also be equivalent to said this change).

The sign-detector $\delta$ through which passes a voltage $r \cos (G'-G)$ has therefore to control a set of sign-inverters acting on the voltages delivered not only by the servo-resolver $R_1$ but also by all the resolvers, such as $R'_1$ arranged on the same shaft as $R_1$.

Under these conditions, if the sign detector $\delta$ is traversed by a negative voltage, i.e. if $$|G'-G| > \frac{\pi}{2}$$

the sign-inverters operate and everything takes place as if the G' shaft rotated abruptly through an angle of π radians.

In fact it is the origin of the G' rotations which is electrically shifted through an angle of π radians concomitantly with the position of stable equilibrium of the G' shaft.

The intervention of sign-detector δ would not therefore product the slightest modification of the voltages delivered by servo-resolver $R_1$ and by resolvers such as $R'_1$ arranged on same shaft, if said shaft reached without any delay its position of stable equilibrium.

But, as the rotation speed of G' shaft is in practice limited to π/4 radians per second, the resulting dynamic error in G'—G is reduced if the displacement of said shaft from its position of stable equilibrium has a lower value, independently of any rotation. Such is indeed the effect of the action of the sign-detector δ.

If the bearing G undergoes an abrupt variation of π radians, when point P passes through the vertical axis Oz, the sign-detector δ operates as soon as the voltage r cos (G'—G) has a negative value sufficiently high to trigger or start said detector. The electrical shift of G' shaft has therefore a slight delay with respect to the discontinuity of G and this delay produces a to-and-fro movement of slight amplitude in the rotation of said G' shaft. But the dynamic error thereby produced in G'—G is very much less than the error produced by a mechanically performed half-turn.

If the bearing G has only a rapid variation because point P reaches the close proximity of vertical axis Oz, the G' shaft may undergo a substantial shift relative to G', but, as soon as this shift exceeds π/2, the sign-detector δ operates and electrically shifts the G' shaft through an angle of π radians, thereby transforming a phase delay greater than π/2 in a phase lead less than π/2. The dynamic error produced on G'—G is thereby materially reduced more especially as there is obtained a certain compensation between the errors arising from the phase delays and thus due to the phase advances which follow the phase delays due to the intervention of sign-detector δ.

It is obvious that, when the voltage r cos (G'—G) which passes through the sign-detector δ becomes positive again, the action of the sign-inverters is cancelled and everything takes place as if G' shaft rotated again through an angle of π radians. In fact, the zero point of the G' rotations returns thus to its original position concomitantly with the position of stable equilibrium of G' shaft and a phase delay greater than π/2 is again converted to a lead less than π/2.

The G' shaft of a bi-stable resolver according to the invention of the type described may therefore actually occupy two positions of stable equilibrium corresponding to the rotation angles G'=G or G'=G+π; said resolver automatically chooses, among said two positions, the position that it can reach by rotating through an angle not greater than π/2 radians. Said two positions of stable equilibrium are moreover equivalent with respect to the values of the voltages delivered by the resolver.

For reasons which clearly result from the foregoing calculations and explanations, the bi-stable servo-resolvers according to the invention thus permit, in analog computers wherein takes place a continuous conversion of rectangular co-ordinates x, y, z to spherical co-ordinates D, G, S, the dynamic errors originating from the existence of a single direction in the spherical co-ordinates system to be stubstantially reduced.

An embodiment of the bi-stable servo-resolver unit of FIG. 2, according to the invention, is shown in FIG. 3.

The bi-stable servo-resolver proper shown generally by block 1 in broken lines comprises a shaft 2 driven in rotation, through a train of gears 3 by a motor 4. The co-ordinates x and y are introduced into servo-resolver 1 by circuits 5 and 6 respectively. The line 7 leads the first output voltage a delivered by servo-resolver 1 to motor 4, through transformer 8, a first sign-inverter 9 and control amplifier 10. The second voltage b delivered by servo-resolver 1 into circuit 11 reaches, through transformer 12, a second sign-inverter 9. The sign-inverters 9 are controlled by a relay 13 receiving the voltage b through an amplifier 14 disposed in parallel to circuit 11.

One embodiment of the amplifier 14, which has for its object to carry out electrically the above mentioned half-turn by changing the sign of the voltages leaving servo-resolver 1 according to the mathematical indications given above, is shown on FIG. 4.

Amplifier 14, which is the main unit of a servo-resolver according to the invention, comprises a double-triode 15 which amplifies voltage b; the amplified voltage is applied to a demodulation circuit of known ring type. The polarity of the rectified voltage is related to the sign of voltage b. An auxiliary bias c is added to the rectified voltage, said bias voltage being intended to act on the "elbow" or bend of the characteristic curve of triode tube 17 actuating the relay 13 of inverters 9.

When the voltage b is positive, the rectified unidirectional voltage leaving the ring demodulator is negative and the relay is not actuated.

On the contrary when the voltage b is negative or equal to zero, the rectified unidirectional voltage is positive, the tube 17 is conductive and actuates relay 13.

Under the influence of tube 17 the relay 13 reverses simultaneously the voltage a (shown in FIG. 3).

Therefore the shaft 2 of servo-resolver 1 remains in position and is not required to perform a π rotation in order to reach its equilibrium position.

Since certain modifications may be made in the device of the present invention without departing from the scope thereof, it is understood that all the features contained in the foregoing description and shown in the accompanying drawings, should be interpreted merely as illustrative and not in a limiting sense.

We claim:

1. A servo-resolver for converting rectangular coordinates to spherical coordinates comprising: a pair of input circuits; means for applying to said input circuits respectively, voltages representing the rectangular coordinates; a rotatable shaft electrically associated with said input circuits; a pair of output circuits; a sign detector connected in one of said output circuits; a series of inverters; means for actuating said inverters from said sign detector, to effect the sign inversion of voltages in said output circuits; and an electric motor for driving said shaft, said motor being energized from the other of said output circuits.

2. A servo-resolver for converting rectangular coordinates to spherical coordinates comprising: first and second input circuits; means for applying to said circuits respectively, voltages representing first and second rectangular coordinates; a rotatable shaft electrically associated with said input circuits; first and second output circuits, each including sign-inverting means, and said first output circuit including a sign detector connected ahead of said sign inverter, said sign detector being connected to actuate both said sign inverting means; and an electric motor connected to be energized by the output of said sign inverting means of said second output circuit, said motor being mechanically coupled to said rotatable shaft.

3. A servo-resolver for converting rectangular coordinates to spherical coordinates comprising: first and second input circuits; means for connecting to said circuits respectively first and second voltages each representing a rectangular coordinate; a rotatable shaft electrically associated with said input circuits; a first output circuit including a first amplifier, a relay connected to the output of said amplifier, and a first sign inverter connected in parallel with said amplifier and relay; a second output circuit including a second sign inverter and a second amplifier connected in series; an electric motor connected to said second output circuit and mechanically coupled to said shaft; and means causing said relay to actuate simultaneously said first and second sign inverters.

4. A servo-resolver as claimed in claim 3, wherein said first amplifier comprises, in series, amplifying means, rectifying means and switching means controlling said relay, said amplifying means receiving the voltage delivered in said first output circuit and delivering an amplified current to said rectifying means, the output of said rectifying means being applied to said switching means.

References Cited in the file of this patent
UNITED STATES PATENTS

| | | |
|---|---|---|
| 2,404,387 | Lovell et al. | July 23, 1946 |
| 2,922,579 | Goldman | Jan. 26, 1960 |